(12) United States Patent
Ye

(10) Patent No.: US 8,914,017 B2
(45) Date of Patent: Dec. 16, 2014

(54) MOBILE COMMUNICATION DEVICES, CELLULAR STATIONS, MULTI-CARRIER SYSTEMS, AND METHODS FOR HANDLING RANDOM ACCESS FAILURES

(75) Inventor: Shiang-Rung Ye, Hsinchu (TW)

(73) Assignee: Acer Incorporated, Taipei Hsien (TW)

( * ) Notice: Subject to any disclaimer, the term of this patent is extended or adjusted under 35 U.S.C. 154(b) by 153 days.

(21) Appl. No.: 13/599,031

(22) Filed: Aug. 30, 2012

(65) Prior Publication Data

US 2013/0143547 A1 Jun. 6, 2013

Related U.S. Application Data

(60) Provisional application No. 61/565,948, filed on Dec. 1, 2011, provisional application No. 61/567,772, filed on Dec. 7, 2011, provisional application No. 61/596,236, filed on Feb. 8, 2012, provisional application No. 61/597,310, filed on Feb. 10, 2012.

(30) Foreign Application Priority Data

Jun. 5, 2012 (TW) .............................. 101120067 A

(51) Int. Cl.
*H04W 4/00* (2009.01)
(52) U.S. Cl.
USPC ...................... 455/422.1; 455/432.1; 455/434; 455/435.2; 455/464; 370/252; 370/329; 370/330; 370/331; 370/332; 370/337
(58) Field of Classification Search
CPC ...... H04L 47/10; H04W 28/04; H04W 28/72; H04W 28/0446; H04W 80/04; H04W 36/30; H04W 88/02; H04W 8/183; H04W 48/16; H04W 48/18; H04B 7/2643; H04M 1/72511

USPC ................. 370/252, 329, 330, 331, 332, 337; 455/422.1, 432.1, 434, 435.2, 464
See application file for complete search history.

(56) References Cited

U.S. PATENT DOCUMENTS 7,545,779 B2 * 6/2009 Majima .......................... 370/337
8,077,670 B2 * 12/2011 Fan et al. ....................... 370/330
(Continued)

FOREIGN PATENT DOCUMENTS

| JP | 2009-201114 | 9/2009 |
|---|---|---|
| JP | 2010-504687 | 2/2010 |

(Continued)

OTHER PUBLICATIONS

Japanese language office action dated Nov. 12, 2013.

(Continued)

*Primary Examiner* — Steve D Agosta
(74) *Attorney, Agent, or Firm* — McClure, Qualey & Rodack, LLP

(57) ABSTRACT

A mobile communication device with a wireless module and a controller module is provided for handling random access failures in a multi-carrier system. The wireless module performs wireless transceiving to and from a cellular station. The controller module performs operations of a Media Access Control (MAC) layer. The operations includes: retrying a random access procedure on a carrier frequency with the cellular station via the wireless module, and stopping the retry of the random access procedure in response to the retry of the random access procedure being failed or receiving a message from the cellular station via the wireless module.

16 Claims, 11 Drawing Sheets

(56) References Cited

U.S. PATENT DOCUMENTS

| | | | |
|---|---|---|---|
| 2009/0215459 A1 | 8/2009 | Kuo | |
| 2010/0272066 A1* | 10/2010 | Wang et al. | 370/331 |
| 2011/0081904 A1 | 4/2011 | Kuo | |
| 2011/0103328 A1* | 5/2011 | Lee et al. | 370/329 |
| 2011/0134774 A1* | 6/2011 | Pelletier et al. | 370/252 |
| 2012/0076042 A1* | 3/2012 | Chun et al. | 370/252 |
| 2012/0302274 A1 | 11/2012 | Ohta et al. | |
| 2013/0003700 A1 | 1/2013 | Zhang et al. | |

FOREIGN PATENT DOCUMENTS

| | | |
|---|---|---|
| JP | 2011-524141 | 8/2011 |
| KR | 10-2011-0037920 | 4/2011 |
| KR | 10-2011-0071445 | 6/2011 |
| WO | WO 2011/099150 | 8/2011 |
| WO | WO 2011/122904 | 10/2011 |
| WO | WO 2011/131044 | 10/2011 |

OTHER PUBLICATIONS

Korean language office action dated Dec. 9, 2013.
English language translation of Korean office action, pub date Dec. 9, 2013.
English language translation of abstract of JP 2009-201114 (published Sep. 3, 2009).
English language translation of abstract of JP 2010-504687 (published Feb. 12, 2010).
English language translation of abstract of KR 10-2011-0071445 (published Jun. 29, 2011).
English language translation of abstract of JP 2011-524141 (published Aug. 25, 2011).

* cited by examiner

MOBILE COMMUNICATION DEVICES, CELLULAR STATIONS, MULTI-CARRIER SYSTEMS, AND METHODS FOR HANDLING RANDOM ACCESS FAILURES

CROSS REFERENCE TO RELATED APPLICATIONS

This application claims priority of U.S. Provisional Application No. 61/565,948, filed on Dec. 1, 2011, the entirety of which is incorporated by reference herein. This application claims priority of U.S. Provisional Application No. 61/567,772, filed on Dec. 7, 2011, the entirety of which is incorporated by reference herein. This application claims priority of U.S. Provisional Application No. 61/596,236, filed on Feb. 8, 2012, the entirety of which is incorporated by reference herein. This application claims priority of U.S. Provisional Application No. 61/597,310, filed on Feb. 10, 2012, the entirety of which is incorporated by reference herein. Also, this application claims priority of Taiwan Patent Application No. 101120067, filed on Jun. 5, 2012, the entirety of which is incorporated by reference herein.

BACKGROUND OF THE INVENTION

1. Field of the Invention

The invention generally relates to the techniques for handling random access failures, and more particularly, to apparatuses, systems, and methods for handling random access failures in a multi-carrier system.

2. Description of the Related Art

In order to meet users' demand for higher data rate in wireless communications, support of wider transmission bandwidths is required. A so-called Carrier Aggregation (CA) technique has been proposed to allow expansion of effective bandwidth delivered to a user terminal through concurrent utilization of radio resources across multiple carriers. The CA technique is most useful when it is difficult to derive a contiguous and extra wide bandwidth. With the CA technique, 2 or more frequency bands may be aggregated to form a larger transmission/receive bandwidth. Each of the aggregated frequency bands is generally referred to as a carrier frequency.

Specifically, each carrier frequency needs to be configured and activated before it may be used for data transmission or reception. The network side may first transmit a Radio Resource Control (RRC) message to configure the carrier frequencies for a Mobile Station (MS) (or may be referred to as a User Equipment), and then transmit a Medium Access Control (MAC) activation command to the MS to activate one of the carrier frequencies. After that, the MS may initiate a random access procedure on the activated carrier frequency for uplink timing alignment, requesting radio resources, or other purposes. If the MS is configured with more than one carrier frequency, there may be several random access procedure being concurrently performed or waiting to be performed on multiple carrier frequencies for the MS.

BRIEF SUMMARY OF THE INVENTION

The invention proposes ways of handling random access failures, so that the multiple random access procedures on different carrier frequencies may be properly coordinated.

In a first aspect of the invention, a mobile communication device comprising a wireless module and a controller module is provided for handling random access failures in a multi-carrier system. The wireless module performs wireless transceiving to and from a cellular station. The controller module performs operations of a Media Access Control (MAC) layer, wherein the operations comprises: retrying a random access procedure on a carrier frequency with the cellular station via the wireless module, and stopping the retry of the random access procedure in response to the retry of the random access procedure being failed or receiving a message from the cellular station via the wireless module.

In a second aspect of the invention, a method for a mobile communication device in a multi-carrier system to handle random access failures for a MAC layer is provided. The method comprises the steps of retrying a random access procedure on a carrier frequency with a cellular station, and stopping the retry of the random access procedure in response to the retry of the random access procedure being failed or receiving a message from the cellular station.

In a third aspect of the invention, a cellular station comprising a wireless module and a controller module is provided for handling random access failures in a multi-carrier system. The wireless module performs wireless transceiving to and from a mobile communication device. The controller module performs a retry of a random access procedure on a carrier frequency with the mobile communication device via the wireless module, and transmits a message to the mobile communication device via the wireless module to stop the mobile communication device from retrying the random access procedure, in response to detecting that the retry of the random access procedure has failed.

In a fourth aspect of the invention, a method for a cellular station in a multi-carrier system to handle random access failures is provided. The method comprises the steps of performing a retry of a random access procedure on a carrier frequency with a mobile communication device, and transmitting a message to the mobile communication device to stop the mobile communication device from retrying the random access procedure, in response to detecting that the retry of the random access procedure has failed.

In a fifth aspect of the invention, a multi-carrier system comprising a mobile communication device and a cellular station is provided for handling random access failures. The mobile communication device performs operations of a MAC layer, wherein the operations comprises: retrying a random access procedure on a carrier frequency, and stopping the retry of the random access procedure in response to the retry of the random access procedure being failed or receiving a message. The cellular station transmits the message to the mobile communication device in response to detecting that the retry of the random access procedure has failed.

In a sixth aspect of the invention, a method for a multi-carrier system comprising a mobile communication device and a cellular station to handle random access failures is provided. The method comprises the steps of retrying, by the mobile communication device, a random access procedure on a carrier frequency with the cellular station, transmitting, by the cellular station, a message to the mobile communication device in response to detecting that the retry of the random access procedure has failed, and stopping, by the mobile communication device, retrying the random access procedure in response to the retry of the random access procedure being failed or receiving the message.

Other aspects and features of the invention will become apparent to those with ordinary skill in the art upon review of the following descriptions of specific embodiments of the mobile communication devices, the cellular stations, multi-carrier systems, and methods for handling random access failures.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
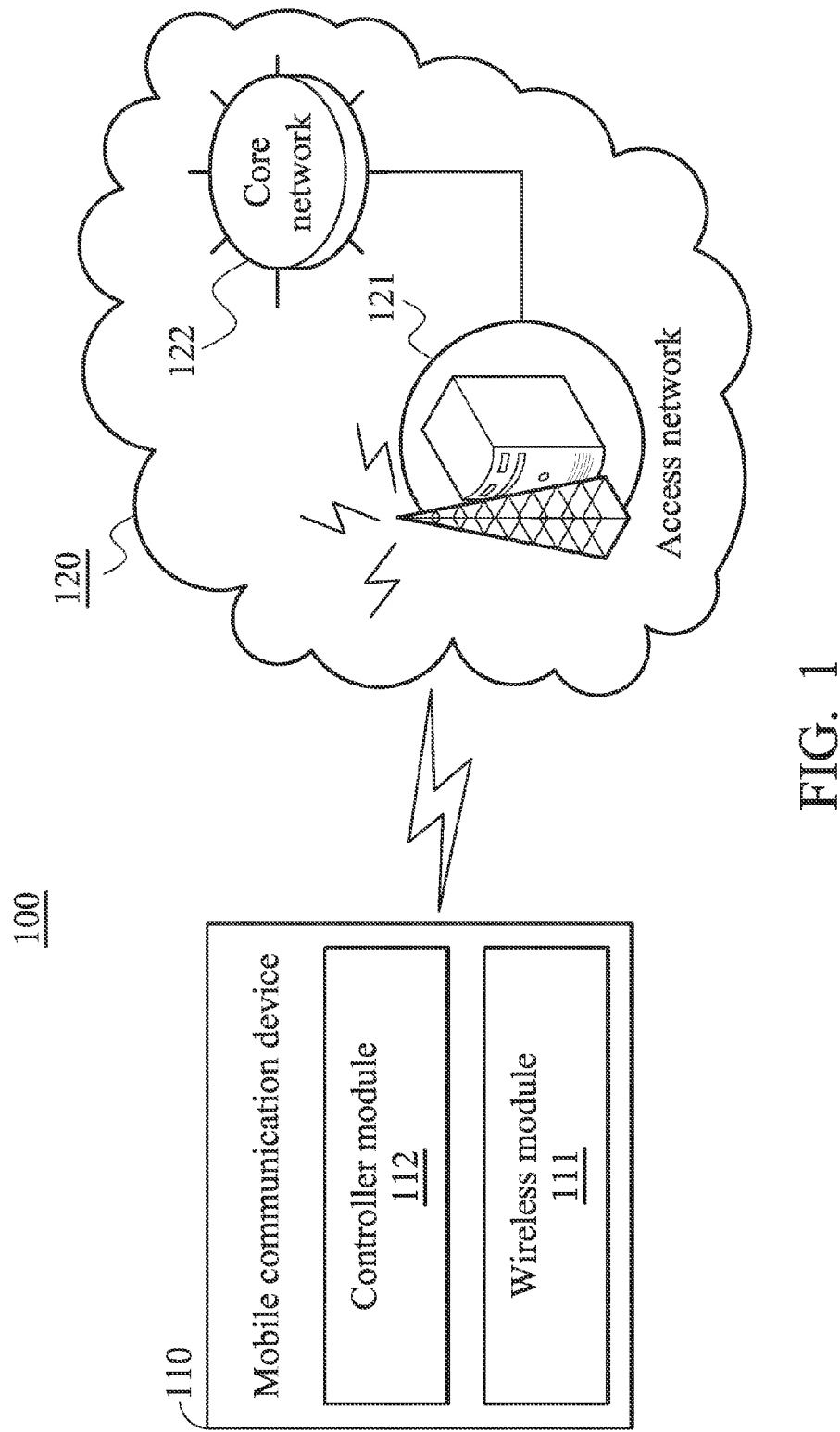
FIG. 1 is a block diagram illustrating a multi-carrier system according to an embodiment of the invention.

FIG. 1 is a block diagram illustrating a multi-carrier system according to an embodiment of the invention. In the multi-carrier system 100, the mobile communication device 110 is wirelessly connected to the service network 120 via the air interface for obtaining wireless services, wherein both of the mobile communication device 110 and the service network 120 support CA technique and multiple carrier frequencies. The service network 120 comprises at least one access network 121 and the core network 122. In general, the access network 121 is controlled by the core network 122 to provide the functionality of wireless transceiving, and the access network 121 may comprise one or more cellular stations, such as base stations, Node-Bs, or evolved Node-B (eNB), depending on the Radio Access Technology (RAT) in use. Particularly, the random access procedures in the invention are performed between the mobile communication device 110 and the cellular station of the access network 121. Although not shown, the core network 122 may further enable interfacing to external networks, such as the Public Switched Telephone Network (PSTN), which is called the Circuit Switched (CS) domain functionality, or interfacing to the Internet Protocol (IP) based Network, such as the Internet, which is called the Packet Switched (PS) domain functionality.

The mobile communication device 110 comprises a wireless module 111 and a controller module 112, wherein the wireless module 111 is configured to perform the functionality of wireless transceiving and the controller module 112 is configured to control the operation of the wireless module 111. To further clarify, the wireless module 111 may be a Radio Frequency (RF) unit (not shown), and the controller module 112 may be a general-purpose processor or Micro-Control Unit (MCU) of a baseband unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in the Wideband Code Division Multiple Access (WCDMA) technology, or may be 900 MHz, 2100 MHz, or 2.6 GHz utilized in LTE/LTE-Advanced technology, or others depending on the RAT in use. Although not shown, the mobile communication device 110 may further comprise other functional components, such as a display unit and/or keypad serving as the Man-Machine Interface (MMI), a storage unit storing the program codes of applications, or others. Similarly, the cellular stations of the access network 121 may each comprise a wireless module and a controller module, wherein the wireless module is controlled by the controller module to perform the functionality of wireless transceiving.

In one embodiment, the service network 120 may be an LTE network, the access network 121 may be an Evolved Universal Terrestrial Radio Access Network (E-UTRAN) which comprises at least one eNB, and the core network 122 may be an Evolved Packet Core (EPC), while the mobile communication device 110 may be an MS or UE which utilizes the LTE technology. Please note that, in other embodiments, instead of the LTE technology, other wireless technologies which support the CA technique and multiple carrier frequencies, such as the LTE-Advanced technology, the Worldwide Interoperability for Microwave Access (WiMAX) technology, and others, may be utilized by the service network 120 and the mobile communication device 110, and the invention is not limited thereto.

In the mobile communication device 110, the controller module 112 controls the wireless module 111 to perform the random access procedures with the cellular station of the access network 121. Specifically, the controller module 112 is configured to perform the operations of the Media Access Control (MAC) layer for handling random access failures. In other words, the methods for handling random access failures proposed in the invention are applied in the MAC layer, so that the retry of the random access procedure may be proactively stopped in the MAC layer when the random access procedure fails.

It is noted that, the controller module 112 is not limited just to perform operations of the MAC layer, it may be also configured to perform operations of other layers of the communication protocol in use, including the Non-Access Stratum (NAS), Radio Resource Control (RRC) layer, and Physical (PHY) layer, etc., for performing procedures other than the random access procedure. Detailed description of the procedures other than the random access procedure is omitted herein, since they are beyond the scope of the invention.

Figure 2:
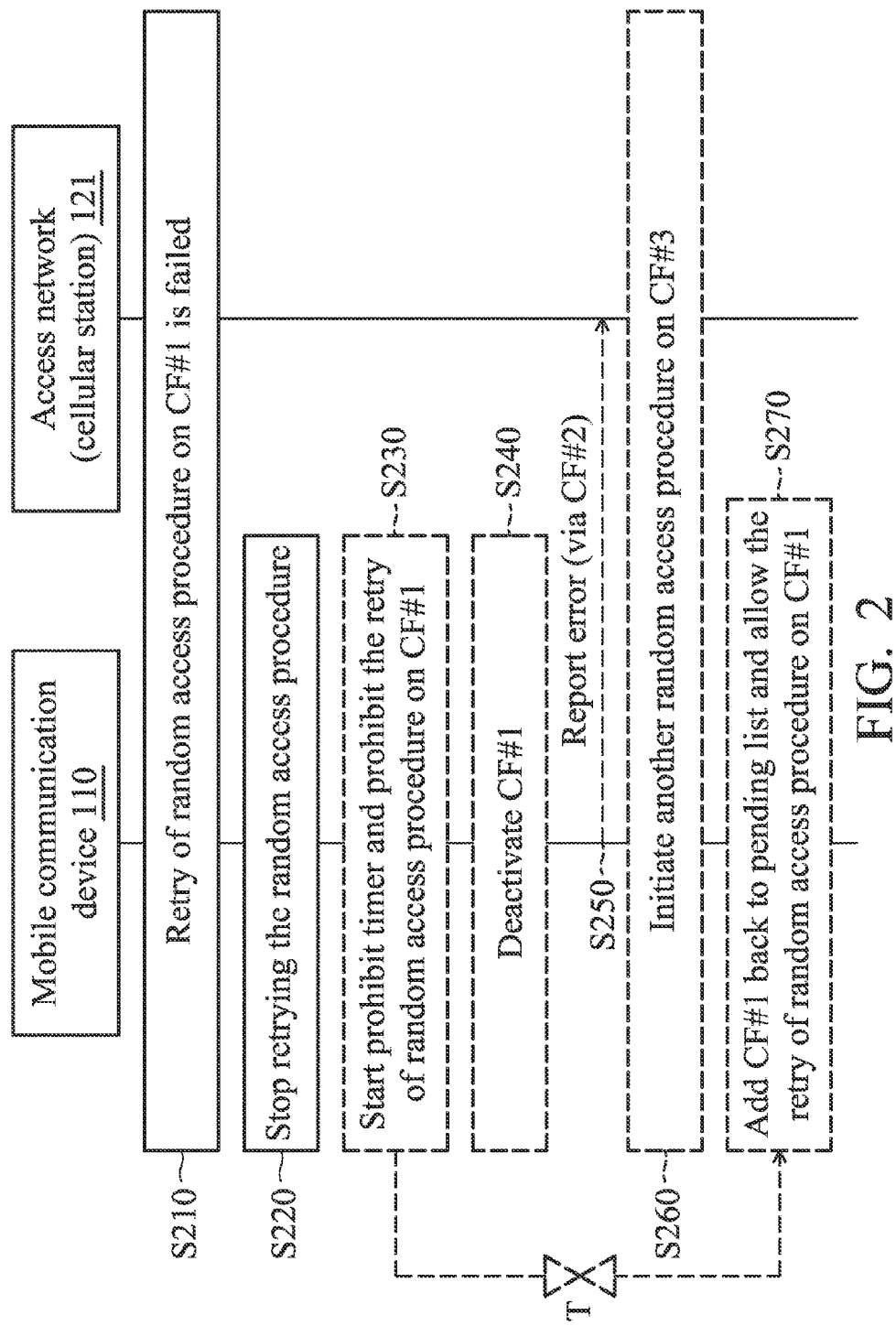
FIG. 2 is a message sequence chart illustrating the handling of a random access failure according to an embodiment of the invention.

FIG. 2 is a message sequence chart illustrating the handling of a random access failure according to an embodiment of the invention. In this embodiment, the access network 121 is an E-UTRAN comprising at least one eNB, and the mobile communication device 110 is an MS utilizing the LTE technology or LTE-Advanced technology. The mobile communication device 110 is initially configured with a plurality of carrier frequencies, and initiates the random access procedure on one of the carrier frequencies (denoted as CF#1 in FIG. 2). However, the random access procedure keeps failing after a predetermined number of retries or after retrying for a predetermined period of time (step S210). In response to detecting the random access failure, the controller module 112 proactively stops retrying the random access procedure (step S220). In one embodiment, in response to stopping the retry of the random access procedure, the controller module 112 may further discard the radio resources associated with the random access procedure, which are indicated by explicitly signaled parameters "ra-PreambleIndex" and "ra-PRACH-MaskIndex" of the MAC layer. By proactively stopping the retry of the random access procedure when detecting the random access failure, improvements may be achieved, e.g., power consumption of the mobile communication device for endlessly retrying the random access procedure may be saved, and resource management efficiency of the cellular station may be improved, etc.

In addition, the controller module 112 may optionally perform subsequent operations to further handle the random access failure, e.g., to improve the usage efficiency of the radio resources of the access network 121. The optional operations are denoted in dotted blocks or dotted lines as shown in FIG. 2. Specifically, the controller module 112 may start a prohibit timer (denoted as T in FIG. 2) (step S230), and during the running period of the prohibit timer, the retry of the random access procedure on CF#1 is prohibited. Next, the controller module 112 may deactivate CF#1 (step S240). Note that, once CF#1 is deactivated, the prohibit timer is stopped as well, and CF#1 has to be reactivated before it can be used for data transmission or reception. Subsequently, the controller module 112 may report, on another carrier frequency (denoted as CF#2 in FIG. 2) via the wireless module 111, the information concerning the random access failure to the access network 121 (step S250). Also, the controller module 112 may initiate another random access procedure on another carrier frequency with higher priority (denoted as CF#3 in FIG. 2) via the wireless module 111 (step S260). That is, the controller module 112 may set a specific priority order for the configured carrier frequencies, and when detecting a random access failure, decreases the priority of the carrier frequency (e.g., CF#1) on which the random access failure occurs. Although different carrier frequencies are used in the steps S250 and S260, the same carrier frequency may be used in the steps S250 and S260 for reporting information concerning the random access failure and for initiating another random access procedure. Alternatively, the performing order of the steps S230 to S260 may be adjusted according to different considerations, and the invention is not limited thereto.

After that, when the prohibit timer expires, the controller module 112 adds CF#1 back to the pending list (step S270). In other words, the retry or re-initiating of the random access procedure on CF#1 is allowed. In another embodiment for the step S270, the controller module 112 may use a timeout counter to keep the number of prohibit timer expirations. When the prohibit timer expires, the controller module 112 increases the value in the timeout counter by 1 and then determines whether the value in the timeout counter is greater than a predetermined threshold. CF#1 is added back to the pending list only if the value in the timeout counter is less than or equal to the predetermined threshold. Otherwise, if the value in the timeout counter is greater than the predetermined threshold, CF#1 remains removed from the pending list. Note that, the step S270 is corresponding to the step S230. That is, if the step S230 is not performed, the step S270 will not be performed, either. Additionally, if the steps S230 and S240 are performed, the step S270 will not be performed due to that the prohibit timer has been stopped for the deactivation of CF#1.

Figure 3:
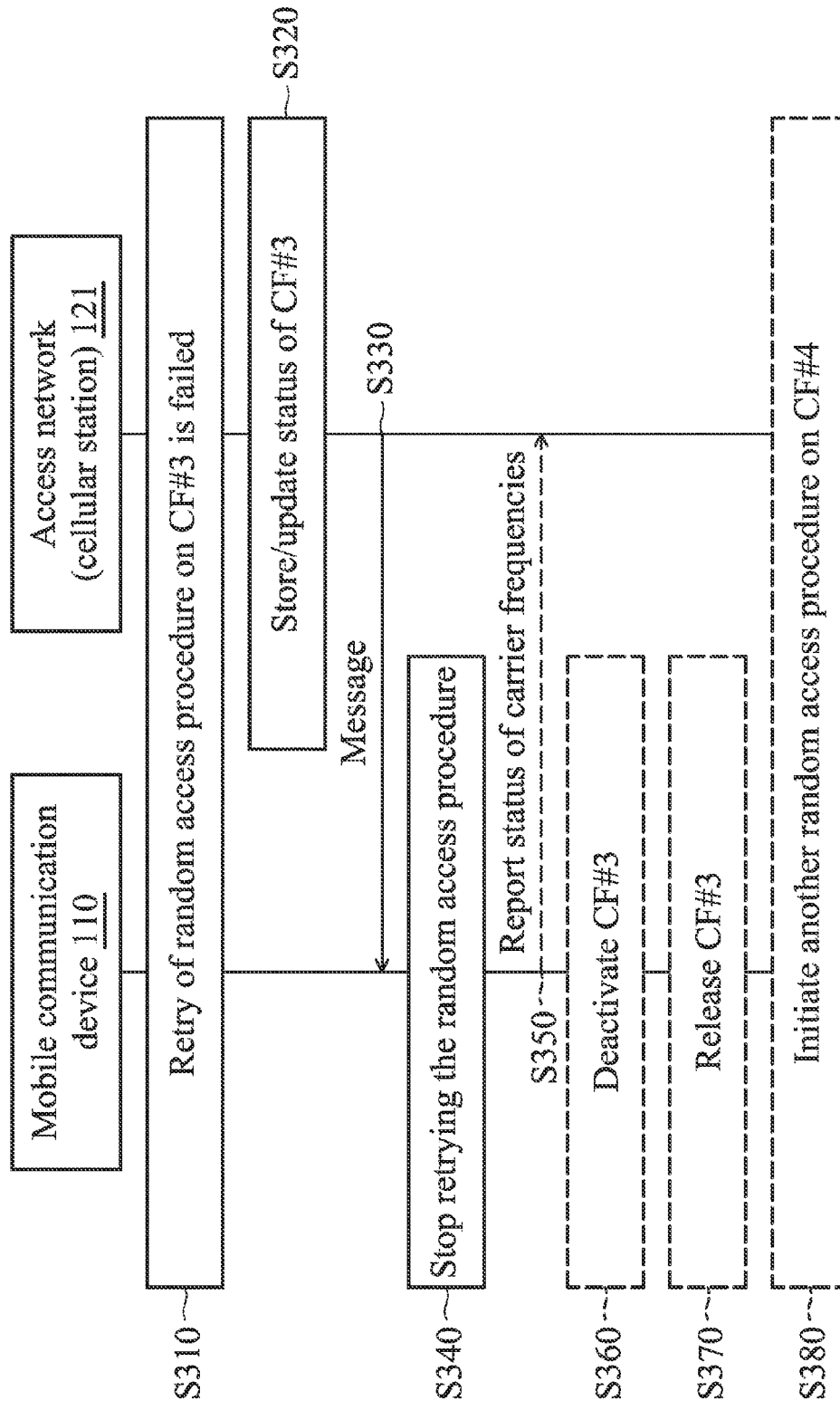
FIG. 3 is a message sequence chart illustrating the handling of a random access failure according to another embodiment of the invention.

FIG. 3 is a message sequence chart illustrating the handling of a random access failure according to another embodiment of the invention. Similar to FIG. 2, the access network 121 is an E-UTRAN comprising at least one eNB, and the mobile communication device 110 is an MS utilizing the LTE technology or LTE-Advanced technology. The mobile communication device 110 is initially configured with a plurality of carrier frequencies, and the carrier frequencies which random access procedures are to be performed on are maintained in a pending list. To begin, the mobile communication device 110 initiates a random access procedure on one of the carrier frequencies (denoted as CF#3 in FIG. 3) in the pending list, but the random access procedure keeps failing after a predetermined number of retries or after retrying for a predetermined period of time (step S310). Later, when the access network 121 detects the random access failure, it stores or updates the status of CF#3 (step S320). In one embodiment, the status of CF#3 may be stored in a storage module, e.g., memory or hard disk, of the cellular station. Subsequently, the access network 121 transmits a message to the mobile communication device 110 (step S330). For example, the message may be a Protocol Data Unit (PDU) of the MAC layer (or referred to as MAC PDU), which comprises a deactivation command, or may be an RRC message which comprises a release or reconfiguration command, or may be a signal of the PHY layer (or referred to as PHY signal), and the invention is not limited thereto. When receiving the message via the wireless module 111, the controller module 112 stops the retry of the random access procedure (step S340).

In addition, the controller module 112 may optionally perform subsequent operations to further handle the random access failure, and the optional operations are denoted in dotted blocks or dotted lines as shown in FIG. 3. Specifically, the message may comprise a request for status report, so that the controller module 112 may report the status of the carrier frequencies to the access network 121 via the wireless module 111 (step S350). For example, the status report may comprise the status information concerning the carrier frequencies in the pending list or may comprise only the status information concerning the carrier frequency on which the random access failure occurs (i.e., CF#3). The status report may be transmitted on a carrier frequency other than the carrier frequency on which the random access failure occurs. With to the status report, the access network 121 may stay in-sync with the mobile communication device 110 according to the status information concerning the carrier frequencies. Next, if the message is a MAC PDU comprising a deactivation command, the controller module 112 may deactivate CF#3 (step S360). Subsequently, if the message is an RRC message comprising a release or reconfiguration command, the controller module 112 may release CF#3 (step S370). Also, the message may further comprise an RA initiation command, so that the controller module 112 initiates another random access procedure on another carrier frequency (denoted as CF#4 in FIG. 3) via the wireless module 111 (step S380). Specifically, the RA initiation command indicates the carrier frequency (i.e., CF#4) on which the mobile communication device 110 should initiate another random access procedure.

In another embodiment for the step S350, the controller module 112 may proactively and periodically report the status of the carrier frequencies to the access network 121 via the wireless module 111, and does not need to wait until detecting the random access failure or receiving the message from the access network 121.

Figure 4:
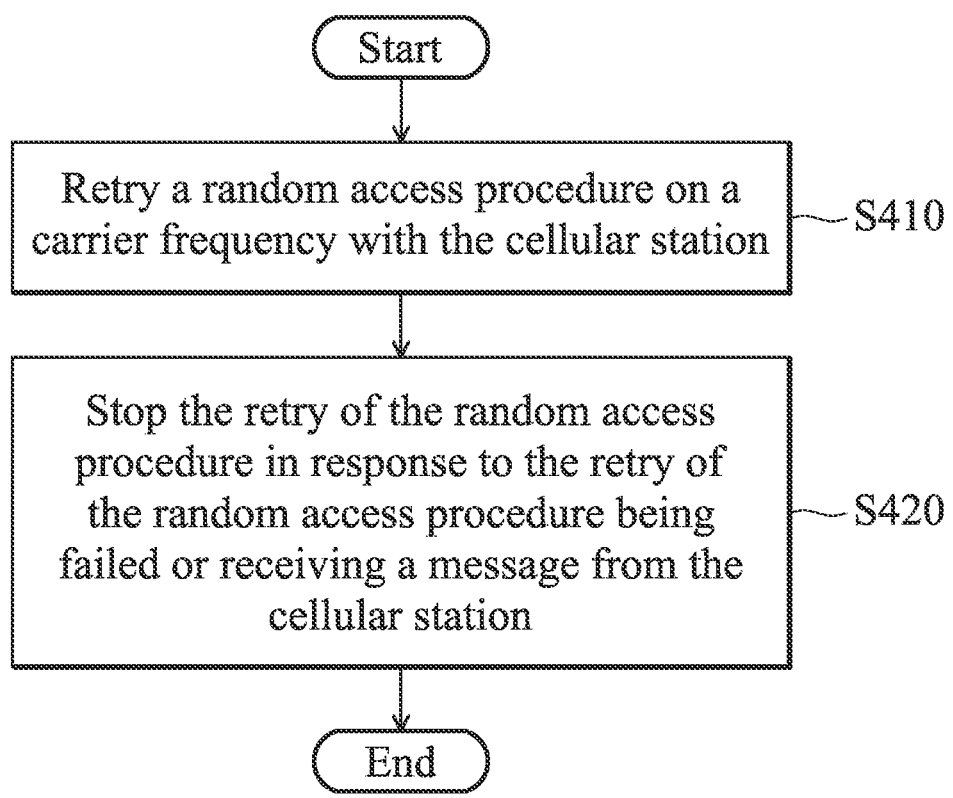
FIG. 4 is a flow chart illustrating the method for handling random access failures by a mobile communication device according to an embodiment of the invention.

FIG. 4 is a flow chart illustrating the method for handling random access failures by a mobile communication device according to an embodiment of the invention. In this embodiment, the method for handling random access failures may be applied in any mobile communication device in a multi-carrier system, which wirelessly connects to a cellular station. To begin, the mobile communication device retries a random access procedure on a carrier frequency with the cellular station (step S410), and stops the retry of the random access procedure in response to the retry of the random access procedure being failed or receiving a message from the cellular station (step S420). Particularly, before stopping the retry of the random access procedure, the random access procedure has been retried for a predetermined number of times or for a predetermined period of time and still failed. By proactively stopping the retry of the random access procedure when detecting the random access failure, improvements may be achieved, e.g., power consumption of the mobile communication device for endlessly retrying the random access procedure may be saved, and resource management efficiency of the cellular station may be improved, etc.

In other embodiments, the mobile communication device may perform subsequent operations to further handle the random access failure, e.g., to improve the usage efficiency of the radio resources of the cellular station. Detailed description of the subsequent operations is given below with respect to FIGS. 5A, 5B, 6A, and 6B.

Figure 5A:
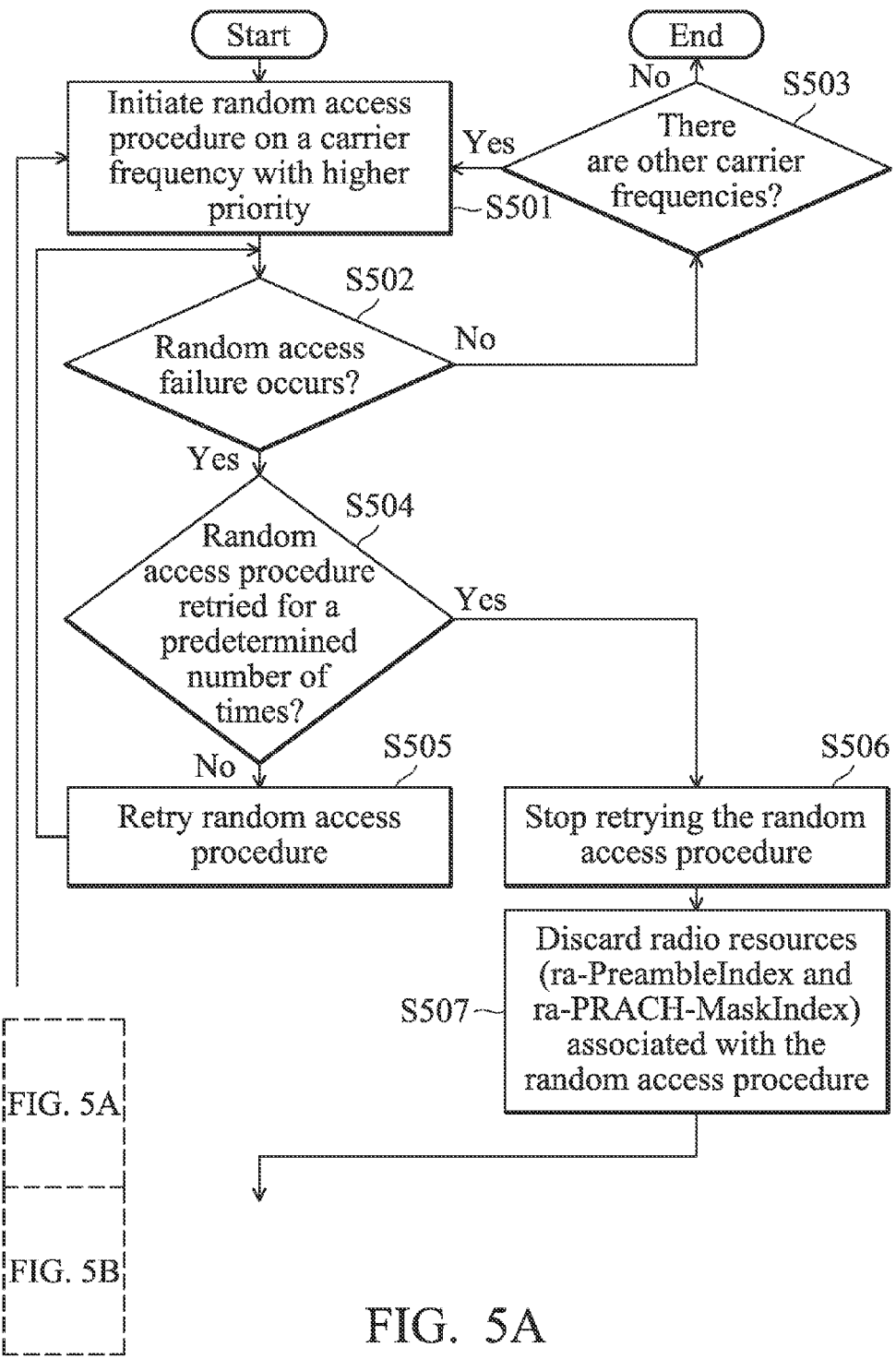
FIGS. 5A and 5B show a flow chart illustrating the method for handling random access failures by a mobile communication device according to another embodiment of the invention.
Figure 5B:
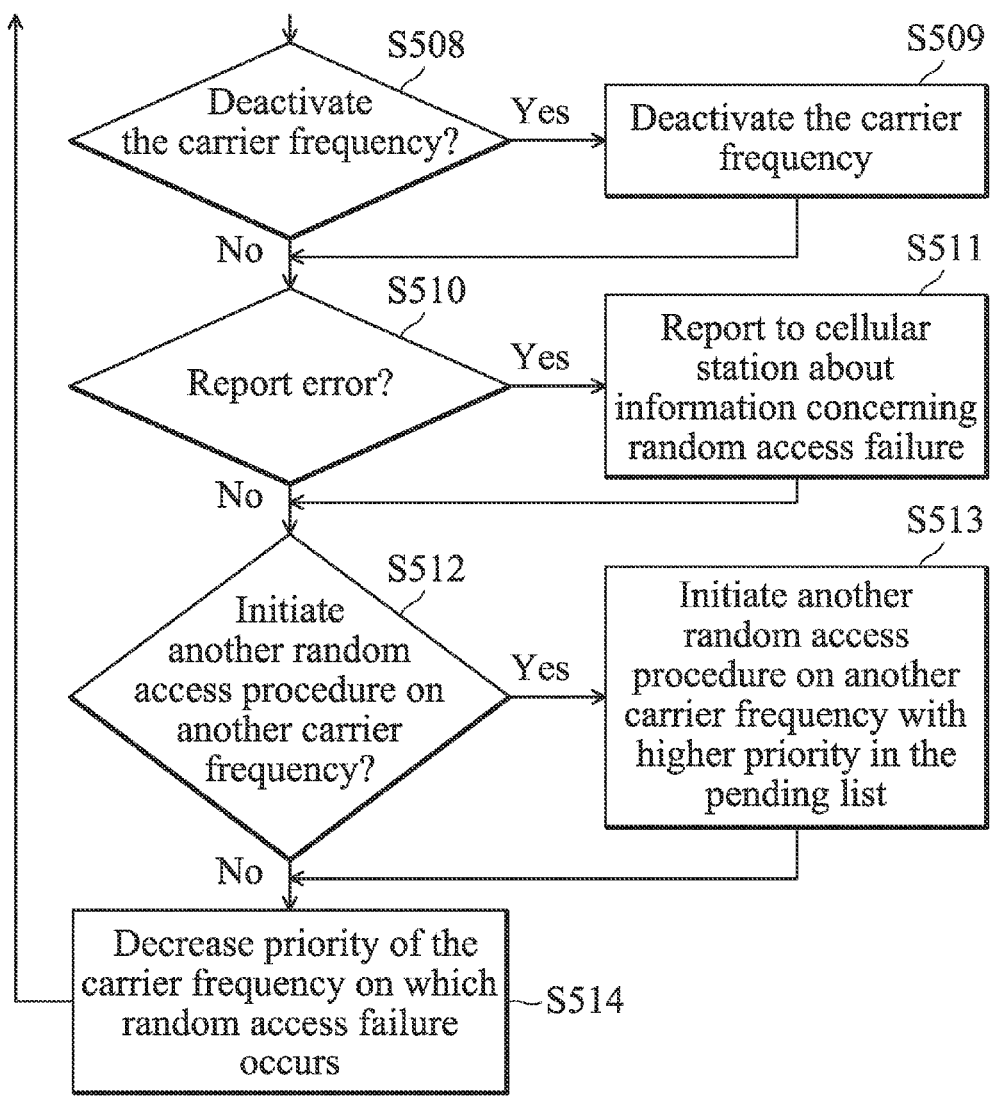

FIGS. 5A and 5B show a flow chart illustrating the method for handling random access failures by a mobile communication device according to another embodiment of the invention. Similar to FIG. 4, the method for handling random access failures may be applied in any mobile communication device in a multi-carrier system, which wirelessly connects to a cellular station. The mobile communication device is initially configured with a plurality of carrier frequencies. Particularly, the carrier frequencies are maintained in a specific order according to their priorities. To begin, the mobile communication device initiates a random access procedure on one of the carrier frequencies with higher priority (step S501), and then determines whether the random access procedure fails or not (S502). If the random access procedure succeeds, the mobile communication device proceeds to determine whether there are other carrier frequencies (step S503), and if so, the method flow goes back to the step S501 to initiate a random access procedure on another one of the carrier frequencies with higher priority, and if not, the method flow ends.

Subsequent to the step S502, if the random access procedure fails, the mobile communication device determines whether the random access procedure has been retried for a predetermined number of times (step S504), and if not, retries the random access procedure (step S505). Otherwise, if the random access procedure has been retried for the predetermined number of times, the mobile communication device stops the retry of the random access procedure (step S506), and then discards the radio resources associated with the random access procedure, which are indicated by explicitly signaled parameters "ra-PreambleIndex" and "ra-PRACH-MaskIndex" of the MAC layer (step S507). The predetermined number of times may be set as a maximum retry limit for the random access procedure. In another embodiment for the step S504, it may be instead determined whether the random access procedure has been retried for a predetermined period of time, and if so, the method flow proceeds to the step S506 to stop the retry of the random access procedure.

Next, the mobile communication device determines whether to perform a series of optional operations as follows. Specifically, the mobile communication device may determine whether to deactivate the carrier frequency or not (step S508), and if so, deactivate the carrier frequency (step S509). Subsequently, the mobile communication device may determine whether to report error to the cellular station (step S510), and if so, report to the cellular station about the information concerning the random access failure (step S511). After the error report, the mobile communication device may determine whether to initiate another random access procedure on another carrier frequency (step S512), and if so, initiate another random access procedure on another one of the carrier frequencies with higher priority in the pending list (step S513). Moreover, the mobile communication device may decrease the priority of the carrier frequency on which the random access failure occurs (step S514), and the method flow goes back to the step S501 to initiate a random access procedure on another one of the carrier frequencies with higher priority.

Figure 6A:
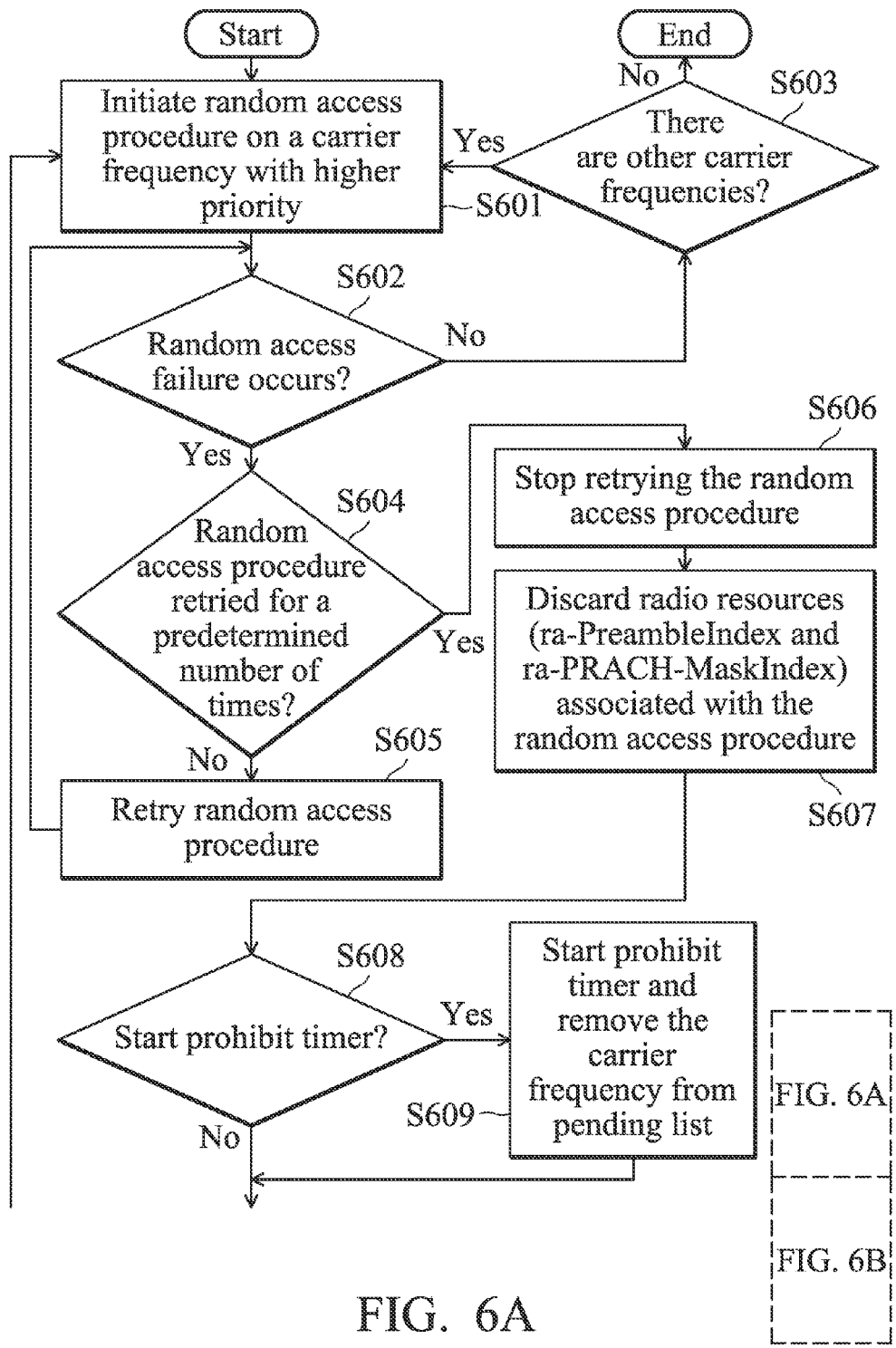
FIGS. 6A and 6B show a flow chart illustrating the method for handling random access failures by a mobile communication device according to yet another embodiment of the invention.
Figure 6B:
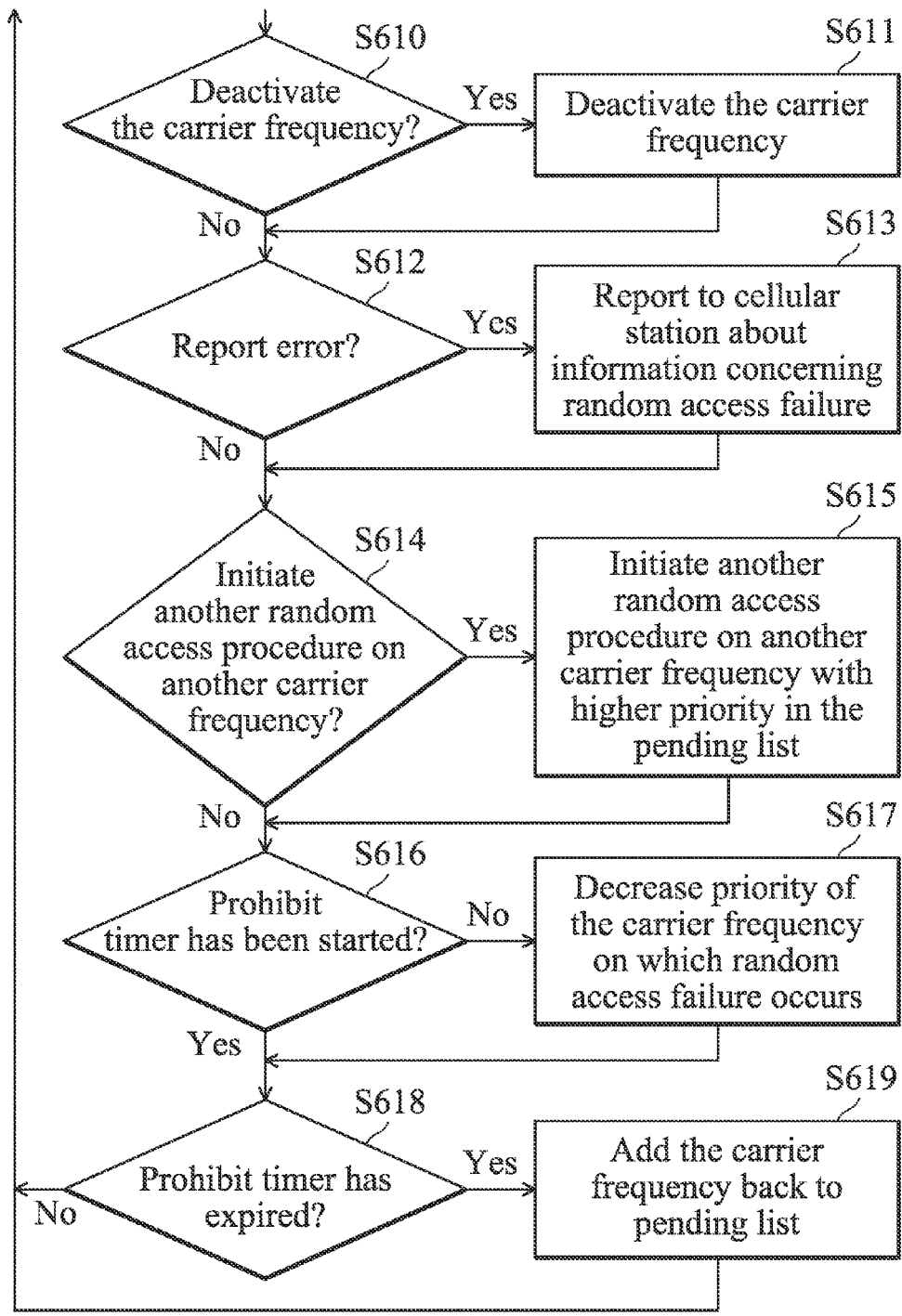

FIGS. 6A and 6B show a flow chart illustrating the method for handling random access failures by a mobile communication device according to yet another embodiment of the invention. In this embodiment, the steps 601 to S607 are similar to the steps S501 to S507 in FIG. 5A, and the mobile communication device then determines whether to perform a series of optional operations after stopping the retry of the random access procedure and discarding the radio resources associated with the random access procedure. Specifically, the mobile communication device may determine whether to start a prohibit timer for the carrier frequency on which the random access failure occurs (step S608), and if so, start the prohibit timer and then remove the carrier frequency from the pending list (S609). Next, the mobile communication device may determine whether to deactivate the carrier frequency on which the random access failure occurs (step S610), and if so, deactivate the carrier frequency (step S611). Subsequently, the mobile communication device may determine whether to report error to the cellular station (step S612), and if so, report to the cellular station about the information concerning the random access failure (step S613). After the error report, the mobile communication device may determine whether to initiate another random access procedure on another carrier frequency (step S614), and if so, initiate another random access procedure on another one of the carrier frequencies with higher priority in the pending list (step S615).

After that, the mobile communication device may determine whether a prohibit timer has been started for the carrier frequency on which the random access failure occurs (step S616), and if not, decrease the priority of the carrier frequency on which the random access failure occurs (step S617). Otherwise, if a prohibit timer has been started for the carrier frequency on which the random access failure occurs, the mobile communication device may determine whether the prohibit timer has expired (step S618), and if so, add the carrier frequency back to the pending list (step S619), and then the method flow goes back to the step S601 to initiate another random access procedure on another carrier frequency with higher priority. Subsequent to the step S618, if the prohibit timer has not expired, the method flow also goes back to the step S601. In another embodiment, the mobile communication device may use a timeout counter to keep the number of prohibit timer expirations. When the prohibit timer expires, the mobile communication device may increase the value in the timeout counter by 1 and then determine whether the value in the timeout counter is greater than a predetermined threshold. The step S619 is performed to add the carrier frequency back to the pending list only if the value in the timeout counter is less than or equal to the predetermined threshold. Otherwise, if the value in the timeout counter is greater than the predetermined threshold, the carrier frequency remains removed from the pending list.

Figure 7:
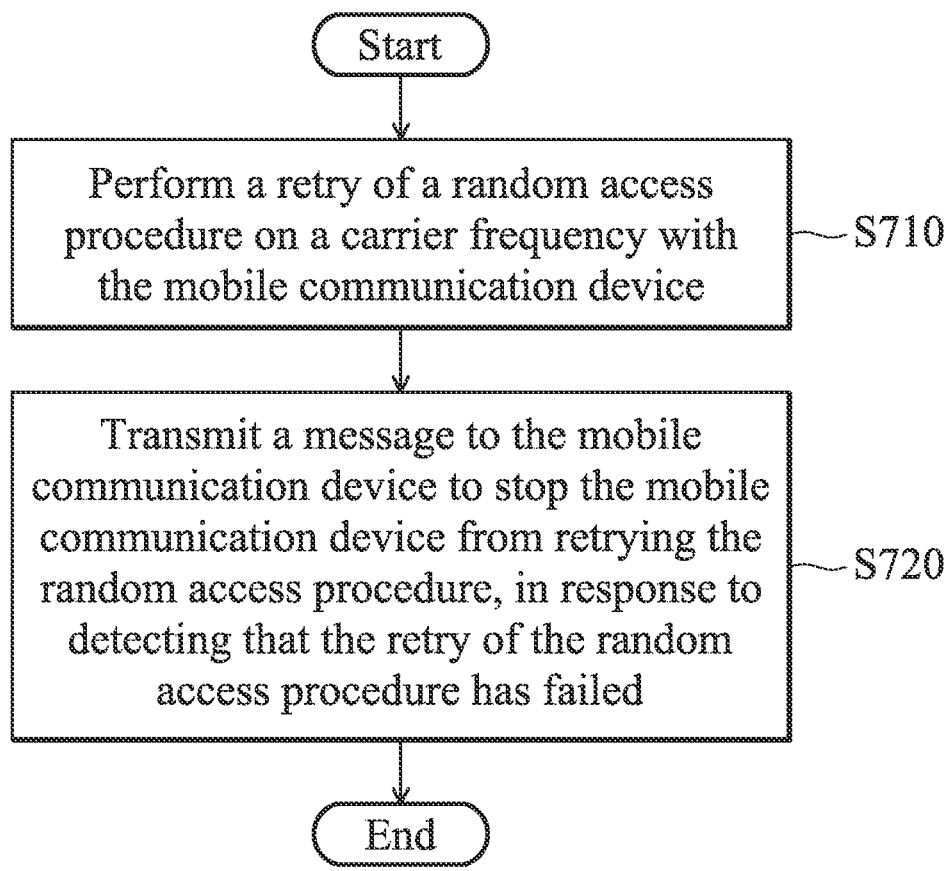
FIG. 7 is a flow chart illustrating the method for handling random access failures by a cellular station according to an embodiment of the invention.

FIG. 7 is a flow chart illustrating the method for handling random access failures by a cellular station according to an embodiment of the invention. In this embodiment, the method for handling random access failures may be applied in any cellular station in a multi-carrier system, which is wirelessly connected with a mobile communication device. To begin, the cellular station performs a retry of a random access procedure on a carrier frequency with the mobile communication device (step S710), and transmits a message to the mobile communication device to stop the mobile communication device from retrying the random access procedure, in response to detecting that the retry of the random access procedure has failed (step S720). Particularly, in the step S720, the message may be transmitted when detecting that the random access procedure has been retried for a predetermined number of times or for a predetermined period of time and still failed. By proactively transmitting a message to stop the mobile communication device from retrying the random access procedure when detecting the random access failure, improvements may be achieved, such as, power consumption of the mobile communication device for endlessly retrying the random access procedure may be saved, and resource management efficiency of the cellular station may be improved, etc.

In other embodiments, after transmitting the message, the cellular station may perform subsequent operations to further handle the random access failure, e.g., to improve the usage efficiency of the radio resources of the cellular station. Detailed description of the subsequent operations is given below with respect to FIGS. 8A and 8B.

Figure 8A:
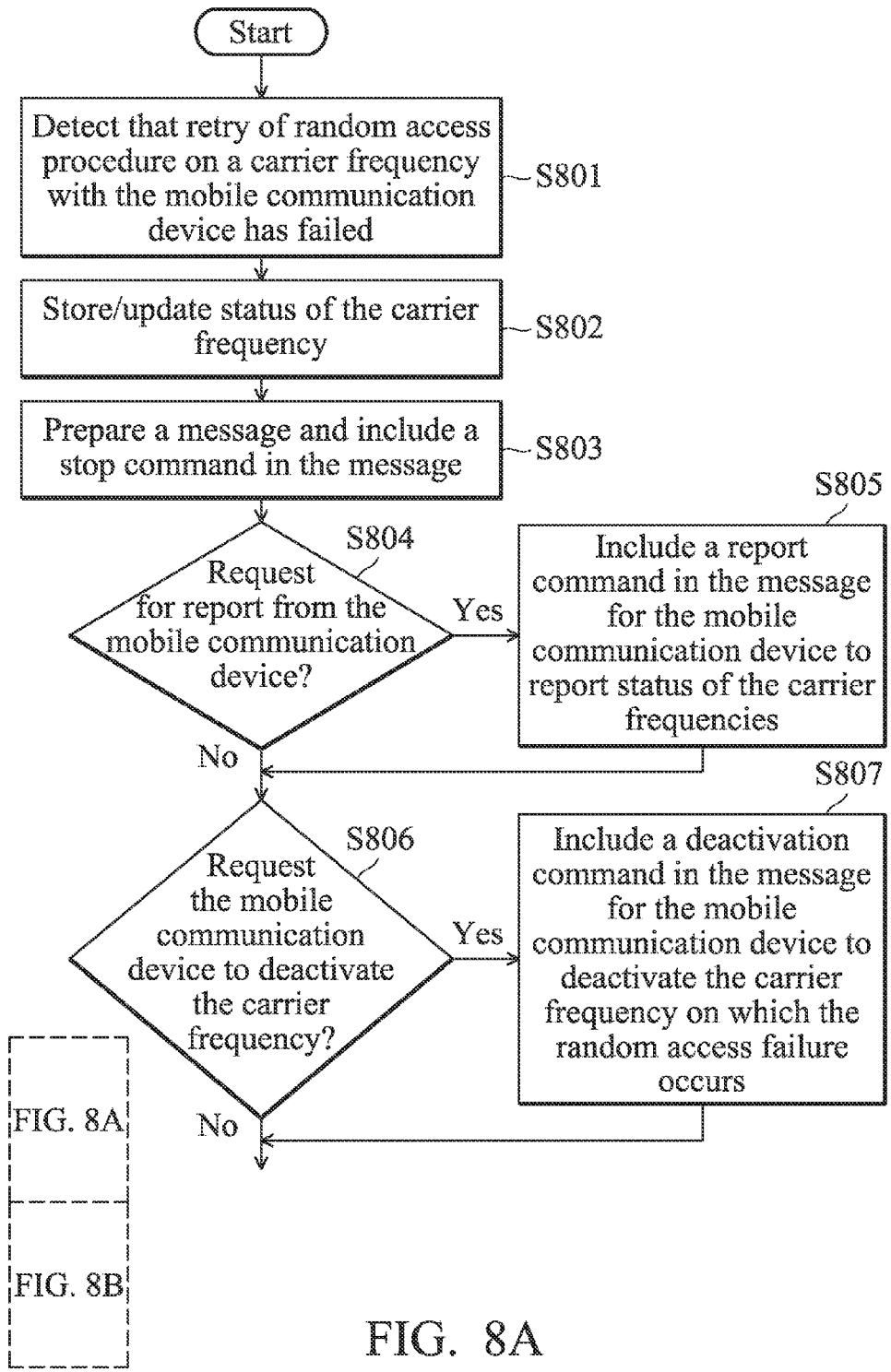
FIGS. 8A and 8B show a flow chart illustrating the method for handling random access failures by a cellular station according to another embodiment of the invention.
Figure 8B:
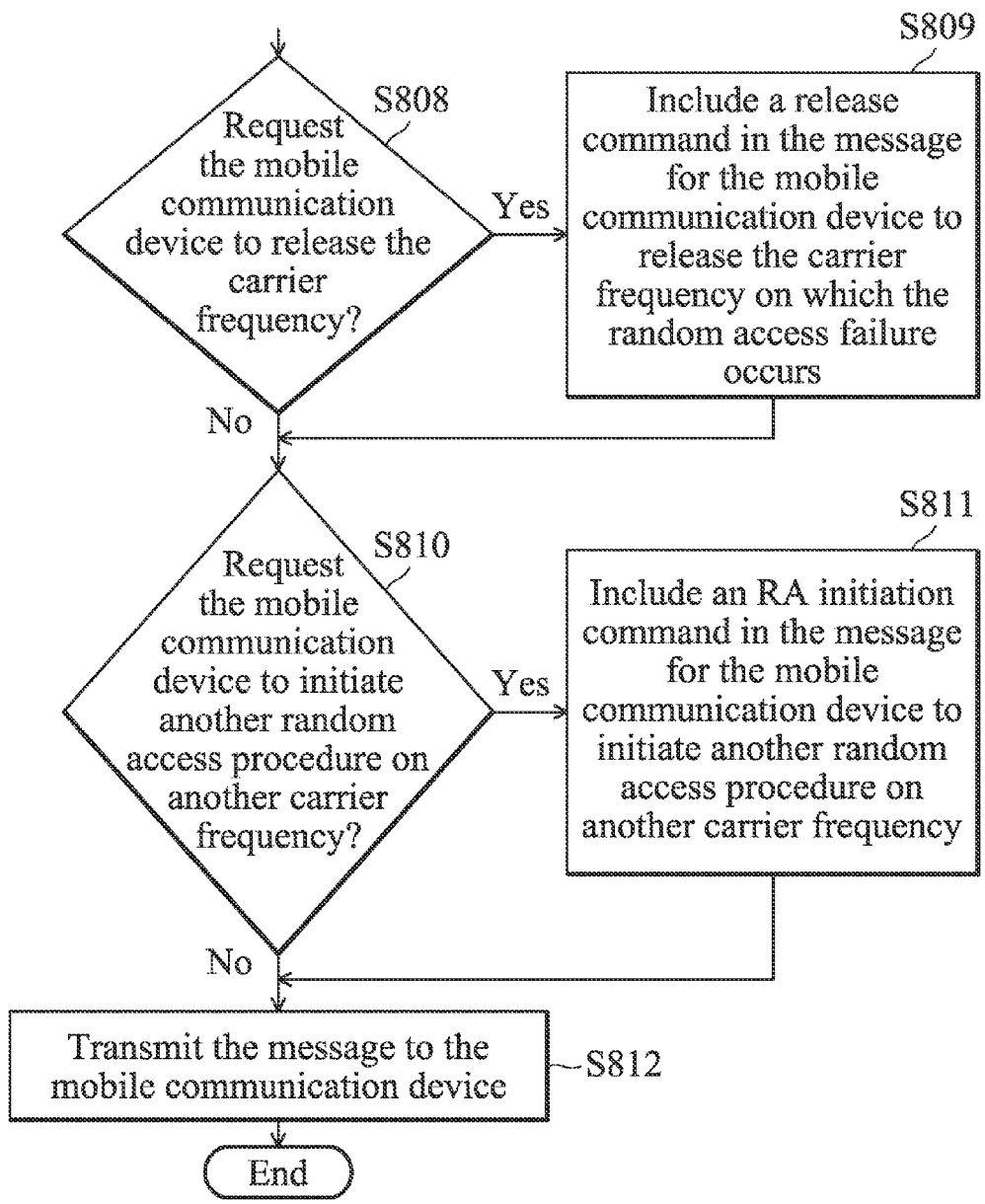

FIGS. 8A and 8B show a flow chart illustrating the method for handling random access failures by a cellular station according to another embodiment of the invention. Similar to FIG. 7, the method for handling random access failures may be applied in any cellular station in a multi-carrier system, which is wirelessly connected with a mobile communication device. To begin, the cellular station detects that a retry of a random access procedure on a carrier frequency with the mobile communication device has failed (step S801), and then stores the status of the carrier frequency in a storage module, or updates the status of the carrier frequency in the storage module (step S802). Subsequently, the cellular station prepares a message and includes a stop command in the message (step S803), wherein the stop command is used for requesting the mobile communication device to stop the retry of the random access procedure. For example, the message may be a MAC PDU, an RRC message, or a PHY signal, and the stop command may be a deactivation command of the MAC layer or a release/reconfiguration command of the RRC layer.

Next, the cellular station determines whether to perform a series of optional operations as follows. Specifically, the cellular station may determine whether to request for report from the mobile communication device (step S804), and if so, include a report command in the message for the mobile communication device to report the status of the carrier frequencies (step S805). Then, the cellular station may determine whether to request the mobile communication device to deactivate the carrier frequency (step S806), and if so, include a deactivation command in the message for the mobile communication device to deactivate the carrier frequency on which the random access failure occurs (step S807). Subsequently, the cellular station may determine whether to request the mobile communication device to release the carrier frequency (step S808), and if so, include a release command in the message for the mobile communication device to release the carrier frequency on which the random access failure occurs (step S809). Moreover, the cellular station may determine whether to request the mobile communication device to initiate another random access procedure on another carrier frequency (step S810), and if so, include an RA initiation command in the message for the mobile communication device to initiate another random access procedure on another carrier frequency (step S811). After that, the cellular station transmits the message to the mobile communication device (step S812).

While the invention has been described by way of example and in terms of preferred embodiment, it is to be understood that the invention is not limited thereto. Those who are skilled in this technology can still make various alterations and modifications without departing from the scope and spirit of this invention. For example, the methods for handling random access failures may also be applied for any evolutionary technology of the LTE/LTE-Advanced technology family, or may also be applied in any mobile communications devices and cellular stations which support CA technique and multiple carrier frequencies. Therefore, the scope of the invention shall be defined and protected by the following claims and their equivalents.

What is claimed is:

1. A mobile communication device for handling random access failures in a multi-carrier system, comprising:
   a wireless module, performing wireless transceiving to and from a cellular station; and
   a controller module, performing operations of a Media Access Control (MAC) layer belonging to a communication protocol of a Long Term Evolution (LTE) technology or an LTE-Advanced technology, wherein the operations comprises: retrying a random access procedure on a carrier frequency with the cellular station via the wireless module, stopping the retry of the random access procedure in response to the retry of the random access procedure being failed or receiving a message from the cellular station via the wireless module, discarding radio resources associated with the random access procedure, which are indicated by explicitly signaled parameters "ra-PreambleIndex" and "ra-PRACH-MaskIndex" of the MAC layer in response to stopping the retry of the random access procedure, and initiating another random access procedure on another carrier frequency with the cellular station via the wireless module, and
   wherein, before stopping the retry of the random access procedure, the random access procedure has been retried for a predetermined number of times or for a predetermined period of time and still failed.

2. A method for a mobile communication device in a multi-carrier system to handle random access failures for a Media Access Control (MAC) layer belonging to a communication protocol of a Long Term Evolution (LTE) technology or an LTE-Advanced technology, comprising:
   retrying a random access procedure on a carrier frequency with a cellular station;
   stopping the retry of the random access procedure in response to the retry of the random access procedure being failed or receiving a message from the cellular station, wherein, before stopping the retry of the random access procedure, the random access procedure has been retried for a predetermined number of times or for a predetermined period of time and still failed;

discarding radio resources associated with the random access procedure, which are indicated by explicitly signaled parameters "ra-PreambleIndex" and "ra-PRACH-MaskIndex" of the MAC layer, in response to stopping the retry of the random access procedure; and initiating another random access procedure on another carrier frequency with the cellular station.

3. A cellular station for handling random access failures in a multi-carrier system, comprising:

a wireless module, performing wireless transceiving to and from a mobile communication device; and a controller module, performing operations of a Media Access Control (MAC) layer belonging to a communication protocol of a Long Term Evolution (LTE) technology or an LTE-Advanced technology, wherein the operations comprises: performing a retry of a random access procedure on a carrier frequency with the mobile communication device via the wireless module, and transmitting a message to the mobile communication device via the wireless module to stop the mobile communication device from retrying the random access procedure, in response to detecting that the retry of the random access procedure has failed for a predetermined number of times or for a predetermined period of time, so that the mobile communication device discards radio resources associated with the random access procedure, which are indicated by explicitly signaled parameters "ra-PreambleIndex" and "ra-PRACH-MaskIndex" of the MAC layer in response to stopping the retry of the random access procedure, and initiates another random access procedure on another carrier frequency with the cellular station.

4. The cellular station of claim 3, wherein the message is a Protocol Data Unit (PDU) of a Media Access Control (MAC) layer or a signal of a Physical (PHY) layer, or is in compliance with a Radio Resource Control (RRC) layer.

5. The cellular station of claim 4, wherein the message in compliance with the RRC layer comprises a release or reconfiguration command for the mobile communication device to release the carrier frequency.

6. A method for a cellular station in a multi-carrier system to handle random access failures for a Media Access Control (MAC) layer belonging to a communication protocol of a Long Term Evolution (LTE) technology or an LTE-Advanced technology, comprising:

performing a retry of a random access procedure on a carrier frequency with a mobile communication device; and transmitting a message to the mobile communication device to stop the mobile communication device from retrying the random access procedure, in response to detecting that the retry of the random access procedure has failed for a predetermined number of times or for a predetermined period of time, so that the mobile communication device discards radio resources associated with the random access procedure, which are indicated by explicitly signaled parameters "ra-PreambleIndex" and "ra-PRACH-MaskIndex" of the MAC layer in response to stopping the retry of the random access procedure, and initiates another random access procedure on another carrier frequency with the cellular station.

7. The method of claim 6, wherein the message is a Protocol Data Unit (PDU) of a Media Access Control (MAC) layer or a signal of a Physical (PHY) layer, or is in compliance with a Radio Resource Control (RRC) layer.

8. The method of claim 7, wherein the message in compliance with the RRC layer comprises a release or reconfiguration command for the mobile communication device to release the carrier frequency.

9. A multi-carrier system for handling random access failures, comprising:

a mobile communication device, performing operations of a Media Access Control (MAC) layer belonging to a communication protocol of a Long Term Evolution (LTE) technology or an LTE-Advanced technology, wherein the operations comprises: retrying a random access procedure on a carrier frequency, stopping the retry of the random access procedure in response to the retry of the random access procedure being failed or receiving a message, discarding radio resources associated with the random access procedure, which are indicated by explicitly signaled parameters "ra-PreambleIndex" and "ra-PRACH-MaskIndex" of the MAC layer in response to stopping the retry of the random access procedure, and initiating another random access procedure on another carrier frequency according to the message, and wherein, before the mobile communication device stops the retry of the random access procedure, the random access procedure has been retried for a predetermined number of times or for a predetermined period of time and still failed; and a cellular station, transmitting the message to the mobile communication device in response to detecting that the retry of the random access procedure has failed.

10. The multi-carrier system of claim 9, wherein the message is a Protocol Data Unit (PDU) of a Media Access Control (MAC) layer or a signal of a Physical (PHY) layer, or is in compliance with a Radio Resource Control (RRC) layer.

11. The multi-carrier system of claim 10, wherein the message in compliance with the RRC layer comprises a release or reconfiguration command for the mobile communication device to release the carrier frequency.

12. The multi-carrier system of claim 9, wherein the cellular station is configured to operate in accordance with the communication protocol of the LTE technology or the LTE-Advanced technology.

13. A method for a multi-carrier system comprising a mobile communication device and a cellular station to handle random access failures, the mobile communication device is configured to perform operations of a Media Access Control (MAC) layer belonging to a communication protocol of a Long Term Evolution (LTE) technology or an LTE-Advanced technology, the method comprising:

retrying, by the mobile communication device, a random access procedure on a carrier frequency with the cellular station;

transmitting, by the cellular station, a message to the mobile communication device in response to detecting that the retry of the random access procedure has failed;

stopping, by the mobile communication device, retrying the random access procedure in response to the retry of the random access procedure being failed or receiving the message, wherein, before the mobile communication device stops the retry of the random access procedure, the random access procedure has been retried for a predetermined number of times or for a predetermined period of time and still failed;

discarding, by the mobile communication device, radio resources associated with the random access procedure, which are indicated by explicitly signaled parameters "ra-PreambleIndex" and "ra-PRACH-MaskIndex" of the MAC layer, in response to stopping the retry of the random access procedure; and initiating, by the mobile communication device, another random access procedure on another carrier frequency according to the message.

14. The method of claim 13, wherein the message is a Protocol Data Unit (PDU) of a Media Access Control (MAC) layer or a signal of a Physical (PHY) layer, or is in compliance with a Radio Resource Control (RRC) layer.

15. The method of claim 14, wherein the message in compliance with the RRC layer comprises a release or reconfiguration command for the mobile communication device to release the carrier frequency.

16. The method of claim 13, wherein the cellular station is configured to operate in accordance with the communication protocol of the LTE technology or the LTE-Advanced technology.

* * * * *